United States Patent
Nguyen et al.

(10) Patent No.: US 6,702,021 B1
(45) Date of Patent: Mar. 9, 2004

(54) METHODS AND DRILLING FLUIDS FOR DRILLING WELL BORES AND SEALING PIPE STRINGS THEREIN

(75) Inventors: Philip D. Nguyen, Duncan, OK (US); Johnny A. Barton, Marlow, OK (US); O'Thalla M. Isenberg, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/295,258

(22) Filed: Nov. 15, 2002

(51) Int. Cl.$^7$ .............................. E21B 33/13; C09K 3/00
(52) U.S. Cl. ..................... 166/295; 166/293; 507/216
(58) Field of Search .................. 166/295, 308, 166/300, 305.1, 307, 292; 507/216, 140, 271, 903

(56) References Cited

U.S. PATENT DOCUMENTS

| | | | |
|---|---|---|---|
| 4,042,032 A | 8/1977 | Anderson | 166/276 |
| 4,427,069 A | 1/1984 | Friedman | 166/295 |
| 4,669,543 A | 6/1987 | Young | 166/276 |
| 4,709,767 A | 12/1987 | Alexander | 175/65 |
| 4,964,465 A | 10/1990 | Surles | 166/295 |
| 5,010,953 A | 4/1991 | Friedman et al. | 166/288 |
| 5,178,218 A | 1/1993 | Dees | 166/281 |
| 5,199,492 A | 4/1993 | Surles et al. | 166/295 |
| 5,285,849 A | 2/1994 | Surles et al. | 166/295 |
| 5,325,922 A * | 7/1994 | Cowan et al. | 166/293 |
| 5,377,759 A | 1/1995 | Surles | 166/295 |
| 5,823,273 A | 10/1998 | Ravi et al. | 175/72 |
| 5,911,282 A * | 6/1999 | Onan et al. | 175/72 |
| 5,944,105 A | 8/1999 | Nguyen | 166/278 |
| 5,981,447 A * | 11/1999 | Chang et al. | 507/271 |
| 6,342,467 B1 * | 1/2002 | Chang et al. | 507/110 |
| 2002/0160919 A1 | 10/2002 | Stowe, II et al. | 507/100 |

* cited by examiner

*Primary Examiner*—Frank Tsay
(74) *Attorney, Agent, or Firm*—Craig W. Roddy; C. Clark Dougherty, Jr.

(57) ABSTRACT

The present invention provides improved well drilling fluids containing hardenable furan sealant compositions and methods of drilling well bores and sealing pipe strings therein utilizing the drilling fluids. The drilling fluids are basically comprised of a base fluid, a viscosity increasing material and a hardenable furan sealant composition which becomes part of the filter cake formed on the walls of the well bore and hardens therein.

60 Claims, No Drawings

METHODS AND DRILLING FLUIDS FOR DRILLING WELL BORES AND SEALING PIPE STRINGS THEREIN

BACKGROUND OF THE INVENTION

1. Field of the Invention

The present invention relates generally to improved drilling fluids and methods of drilling subterranean well bores and sealing pipe strings therein, and more particularly, to such drilling fluids and methods wherein hardenable furan sealant compositions are utilized.

2. Description of the Prior Art

A variety of drilling fluids have been used heretofore in drilling subterranean well bores. The most commonly used drilling fluids are solids-containing water or oil based viscous gels which are often weighted with particulate weighting materials such as barite. The oil based drilling fluids are generally inverted oil-water emulsions containing organophilic clays, weighting materials and other additives. When a well bore is being drilled, the drilling fluid is circulated downwardly through the drill string, through the drill bit and upwardly in the annulus between the walls of the well bore and the drill string. The drilling fluid functions to maintain hydrostatic pressure on subterranean formations penetrated by the well bore and thereby prevent blow-outs and to remove cuttings from the well bore. As the drilling fluid is circulated, a filter cake of solids from the drilling fluid forms on the walls of the well bore. The filter cake build-up is a result of initial fluid loss into the permeable subterranean formations and zones penetrated by the well bore. The filter cake and gelled or partially gelled drilling fluid mixed therewith function to reduce additional fluid loss as the well is drilled.

After the well bore reaches its total depth, the drilling and circulation of drilling fluid are stopped and a string of pipe, e.g., casing, is run into the well bore. After the pipe string is run, the well bore has heretofore been conditioned by circulating drilling fluid downwardly through the pipe string and upwardly through the annulus. The conditioning has been intended to remove filter cake and gelled or partially gelled drilling fluid from the walls of the well bore. Primary cementing operations have then been performed in the well bore. That is, the string of pipe disposed in the well bore has been cemented therein by placing a cement slurry in the annulus and allowing it to set into a hard mass therein. When the cement slurry is run down the pipe and into the annulus, the drilling fluid in the pipe and the annulus is displaced therefrom.

The purpose of cementing the above mentioned string of pipe in the well bore is to provide physical support and positioning to the pipe and seal the annulus. That is, it is intended that the set cement in the annulus will bond to the pipe and to the walls of the well bore whereby the annulus is sealed in a manner which prevents pressurized fluid migration between subterranean zones and formations penetrated by the well bore. However, the sealing of the annulus is often frustrated by filter cake and gelled drilling fluid which remain on the walls of the well bore when primary cementing operations are commenced. That is, when the cement slurry is placed in the annulus and allowed to set therein, thin layers of unconsolidated filter cake solids and gelled drilling fluid often remain between the set cement and the walls of the well bore including the faces of permeable formations or zones containing pressurized fluids. Since the inert layers of unconsolidated solids do not have the physical properties necessary to prevent pressurized fluid migration, such migration takes place by way of flow channels formed through the layers.

While a variety of techniques have heretofore been developed and many attempts to remove filter cake from the walls of well bores and increase the displacement efficiencies of gelled drilling fluids therefrom have been made prior to cementing pipe therein, continuing needs remain for improved drilling fluids, improved methods of drilling and improved methods of sealing pipe in well bores.

SUMMARY OF THE INVENTION

By the present invention, improved drilling fluids and methods of utilizing the drilling fluids for drilling subterranean well bores are provided which meet the needs described above and overcome the shortcomings of the prior art. In addition, the methods of the present invention include the effective sealing of pipe strings in well bores utilizing hardenable furan sealant compositions which are very resistant to chemicals and high temperature environments and provide greatly superior and longer lasting seals between well bores and strings of pipe therein.

The improved drilling fluids of the present invention for use in drilling subterranean well bores are basically comprised of a water base or oil base drilling fluid containing a viscosity increasing material and a hardenable furan sealant composition dispersed therein. When the drilling fluid forms filter cake on the walls of a well bore being drilled, the hardenable furan sealant composition becomes a part of the filter cake and subsequently hardens therein whereby the filter cake is consolidated into a stable solid mass. The consolidation of the filter cake into a solid mass is highly beneficial in that it causes the filter cake to provide greater fluid loss control, to prevent or greatly reduce the occurrence of lost drilling fluid circulation and to prevent or reduce the influx of pressurized formation gas into the well bore during and after a pipe string is sealed therein.

After the well bore is drilled and a string of pipe has been run therein, the string of pipe can be sealed within the well bore by an additional hardenable furan sealant composition that readily bonds to the solidified filter cake and to the string of pipe. Since the hardened furan sealant composition produces a very strong bond to the surfaces of the string of pipe as well as to the solidified walls of the well bore, a greatly superior and longer lasting seal between the well bore and the string of pipe is obtained.

The improved methods of the present invention for drilling a well bore are basically comprised of the following steps. A water or oil based drilling fluid which forms a filter cake on the walls of the well bore as the well bore is drilled is provided which is comprised of a base fluid selected from the group of water or oil, a viscosity increasing material and a hardenable furan sealing composition which becomes a part of the filter cake formed on the walls of the well bore. When the furan sealant composition hardens in the filter cake, the filter cake is consolidated into a stable solid mass. When the well bore being drilled reaches total depth and a string of pipe is run into the well bore, a hardenable furan sealant composition is placed between the pipe and the walls of the well bore and allowed to harden therein.

The objects, features and advantages of the present invention will be readily apparent to those skilled in the art upon a reading of the description of preferred embodiments which follows.

DESCRIPTION OF PREFERRED EMBODIMENTS

The improved drilling fluids of this invention are basically comprised of water or oil base fluids containing a viscosity increasing material such as bentonite clay or an organophilic clay and a hardenable furan sealant composition dispersed therein. As will be understood by those skilled in the art, the drilling fluid can include other components such as weighting materials and the like.

The hardenable furan sealant composition in the drilling fluid becomes a part of the filter cake formed on the walls of the well bore, and the sealant composition hardens in the filter cake thereby consolidating the filter cake into a stable solid mass. The strength and other properties of the consolidated filter cake are sufficient to prevent or minimize fluid loss from the drilling fluid, lost drilling fluid circulation and the influx of pressurized formation fluids into the well bore during and after a pipe string is sealed therein.

The hardenable furan sealant composition dispersed in the drilling fluid is basically comprised of a curable furan liquid and a silane coupling agent. More preferably the hardenable furan sealant composition is comprised of a furan liquid resin, a furfuryl alcohol, a hydrolyzable ester, a silane coupling agent and optionally, a solvent for the furan liquid resin.

Examples of furan liquid resins that can be included in the sealant compositions include, but are not limited to, furfuryl alcohol resin, furfuraldehyde and a phenolic-furfuraldehyde mixture. Of these, furfuryl alcohol resin is preferred. The furan liquid resin functions in the sealant composition as a heat or acid curable resin and is generally present in the sealant composition comprised only of the furan liquid resin and a silane coupling agent in an amount in the range of from about 95% to about 99.9% by weight of the composition with the silane coupling agent being present in an amount in the range of from about 0.1% to about 5% by weight of the composition.

The furan liquid resin is present in the more preferred hardenable furan sealant composition in an amount in the range of from about 20% to about 80% by weight thereof, more preferably in an amount of from about 40% to about 70% and most preferably about 50%.

The furfuryl alcohol is included in the preferred sealant composition to provide additional curable resin and is generally present in the sealant composition in an amount in the range of from about 1% to about 50% by weight thereof, more preferably in an amount of from about 2% to about 40% and most preferably about 20%.

Examples of hydrolyzable esters which can be utilized in the preferred sealant composition include, but are not limited to, furfuryl acetate, butyl acetate and methyl salicylate. Of these, furfuryl acetate is preferred. The hydrolyzable ester functions in the sealant composition to provide an acid catalyst and to remove water produced in the polymerization of the resin. The hydrolyzable ester is generally present in the sealant composition in an amount in the range of from about 1% to about 20% by weight thereof, more preferably from about 5% to about 15% and most preferably about 10%.

Examples of silane coupling agents which can be utilized in the sealing compositions include, but are not limited to, N-2-(aminoethyl)-3-aminopropyltrimethoxysilane, 3-glycidoxypropyltrimethoxysilane and n-beta-(aminoethyl)-gamma-aminopropyltrimethoxysilane. Of these, n-beta-(aminoethyl)-gamma-aminopropyltrimethoxysilane is preferred. The silane coupling agent is present in the sealant compositions in the general amount in the range of from about 0.01% to about 5% by weight thereof, more preferably from about 0.1% to about 3% and most preferably about 2%.

A variety of solvents for the furan resin can optionally be utilized in the preferred composition including, but not limited to, furfuryl alcohol, furfuryl acetate, dipropylene glycol methyl ether, dipropylene glycol dimethyl ether, diethylene glycol methyl ether, ethylene glycol monobutyl ether, diethylene glycol butyl ether, dimethyl formamide, propylene carbonate, butyl acetate, d'limonene and fatty acid methyl esters. Of these, ethylene glycol monobutyl ether, furfuryl alcohol and furfuryl acetate are preferred with furfuryl acetate being the most preferred. When used, the solvent is included in the preferred hardenable resin composition in an amount in the range of from about 1% to about 30% by weight of the composition in an amount in the range of from about 1% to about 30% by weight of the composition and more preferably in an amount of from about 1% to about 15%.

The hardenable furan sealant composition utilized is generally present in the drilling fluid in an amount in the range of from about 0.01% to about 40% by weight of the drilling fluid, more preferably in an amount of from about 0.1% to about 10% and most preferably about 2%.

After the well bore has been drilled to total depth and all or part of the hardenable furan sealant composition dispersed in the drilling fluid has become a part of the filter cake formed on the walls of the well bore, a pipe string is run into the well bore. After the pipe string has been run, a furan sealant composition comprised of a furan liquid resin, a furfuryl alcohol, a furfuryl alcohol, a hydrolyzable ester, a silane coupling agent, and optionally a solvent for the resin in the amounts set forth above is placed between the pipe string and the walls of the well bore thereby displacing drilling fluid from the well bore. The furan sealant composition is allowed to harden and form a very strong bond to the pipe string surface as well as to the solidified walls of the well bore. Because the furan sealant composition is very resistant to chemicals and high temperature degradation, a greatly superior and longer lasting seal between the walls of the well bore and the pipe string therein is provided.

The furan sealant composition utilized to seal the pipe string in the well bore can also include fillers such as crystalline silicas, amorphous silicas, clays, calcium carbonate, light weight polymer beads, ceramic microspheres, carbon powder, charcoal powder, ground up rubber particulate from old tires or a mixture of one or more of such fillers. Generally, a ceramic microsphere filler is preferred. When used, the filler can be present in the sealant composition in an amount up to about 95% by weight of the composition.

An improved method of drilling a well bore of this invention is comprised of the steps of: (a) providing a drilling fluid which forms a filter cake on the walls of the well bore as the well bore is drilled comprised of a base fluid selected from the group consisting of water and oil, a viscosity increasing material and a hardenable furan sealant composition which becomes part of the filter cake formed on the walls of the well bore and hardens therein whereby the filter cake is consolidated into a stable mass, the hardenable furan sealant composition comprising a furan liquid resin and a silane coupling agent; and (b) drilling the well bore using the drilling fluid.

Another preferred method of drilling a well bore of this invention is comprised of the steps of: (a) providing a drilling fluid which forms a filter cake on the walls of the well bore as the well bore is drilled comprised of a base fluid selected from the group consisting of water and oil, a viscosity increasing material and a hardenable furan sealant composition which becomes part of the filter cake formed on the walls of the well bore and hardens therein whereby the filter cake is consolidated into a stable mass, the hardenable furan sealant composition comprising a furan liquid resin, a furfuryl alcohol, a hydrolyzable ester, a silane coupling agent and optionally, a solvent for the resin; and (b) drilling the well bore using the drilling fluid.

A method of this invention for drilling a well bore and sealing a pipe string therein comprises the steps of: (a) providing a drilling fluid which forms a filter cake on the walls of the well bore as the well bore is drilled comprised of a base fluid selected from the group consisting of water and oil, a viscosity increasing material and a hardenable furan sealant composition which becomes a part of the filter cake formed on the walls of the well bore and hardens therein whereby the filter cake is consolidated into a stable solid mass, the hardenable furan sealant composition comprising a furan liquid resin and a silane coupling agent; (b) drilling the well bore using the drilling fluid; (c) running a pipe string in the well bore; (d) placing a furan sealant composition comprised of a furan liquid resin and a silane coupling agent between the pipe and the walls of the well bore; and (e) allowing the furan sealant composition to harden therein.

Another method of this invention for drilling a well bore and sealing a pipe string therein comprises the steps of: (a) providing a drilling fluid which forms a filter cake on the walls of the well bore as the well bore is drilled comprised of a base fluid selected from the group consisting of water and oil, a viscosity increasing material and a hardenable furan sealant composition which becomes a part of the filter cake formed on the walls of the well bore and hardens therein whereby the filter cake is consolidated into a stable solid mass, the hardenable furan sealant composition comprising a furan liquid resin, a furfuryl alcohol, a hydrolyzable ester and a silane coupling agent; (b) drilling the well bore using the drilling fluid; (c) running a pipe string in the well bore; (d) placing a furan sealant composition comprised of a furan liquid resin, a furfuryl alcohol, a hydrolyzable ester and a silane coupling agent between the pipe and the walls of the well bore; and (e) allowing the furan sealant composition to harden therein.

An improved drilling fluid for use in drilling a well bore which forms filter cake on the walls of the well bore is comprised of: a base fluid selected from the group consisting of water and oil; a viscosity increasing material; and a hardenable furan sealant composition which becomes a part of the filter cake formed on the walls of the well bore and hardens therein whereby the filter cake is consolidated into a stable solid mass, the sealant composition comprising a furan liquid resin and a silane coupling agent.

Another improved drilling fluid for use in drilling a well bore which forms filter cake on the walls of the well bore is comprised of: a base fluid selected from the group consisting of water and oil; a viscosity increasing material; and a hardenable furan sealant composition which becomes a part of the filter cake formed on the walls of the well bore and hardens therein whereby the filter cake is consolidated into a stable solid mass, the sealant composition comprising a furan liquid resin, a furfuryl alcohol, a hydrolyzable ester and a silane coupling agent.

In order to further illustrate the drilling fluids and methods of this invention, the following examples are given.

EXAMPLE

A furan liquid resin composition was diluted or thinned down with butyl acetate or furfuryl acetate. To this mixture, a silane coupling agent was added and stirred. The resin mixture was then added to 70/170-mesh sand which acts as filler for the resin. In some tests, ceramic microspheres were also added to be used as light weight filler. The resin and solid additives were stirred well until a pumpable paste was observed. The resin paste was then poured into a 1-inch brass chamber. The content was packed and cured in an oven at 325° F. for 96 hours. After curing, the cores were obtained for unconfined compressive strength measurements. The components in the furan resin compositions tested and the results of the compressive strength measurements are given in the Table below.

TABLE

Furan Liquid Resin Compositions And Compressive Strengths

| COMPOSITION | Sample 1 | Sample 2 | Sample 3 | Sample 4 | Sample 5 | Sample 6 | Sample 7 | Sample 8 |
|---|---|---|---|---|---|---|---|---|
| Furan resin system, mL | System 1, 20 | System 1, 20 | System 1, 20 | System 1, 20 | System 1, 22 | System 1, 22 | System 2, 22 | System 2, 22 |
| Butyl acetate (BA) or Furfuryl acetate (FA), mL | 5 (BA) | 5 (BA) | 5 (FA) | 5 (FA) | 10 (BA) | 10 (FA) | 10 (DA) | 10 (FA) |
| Silane Coupling agent, mL | 0.2 | 0.2 | 0.2 | 0.2 | 0.3 | 0.3 | 0.3 | 0.3 |
| 70/170-mesh sand, grams | 120 | 120 | 120 | 120 | 120 | 120 | 120 | 120 |
| Ceramic microsphere, grams | 0 | 0 | 0 | 0 | 10 | 10 | 10 | 10 |
| Cure time @ 325° F., days | 4 | 4 | 4 | 4 | 3 | 3 | 3 | 3 |
| Compressive strengths, psi | 3509 | 3604 | 5915 | 6218 | 572 | 3984 | 1365 | 7579 |

From the Table, it can be seen that the furan resin compositions had good compressive strengths.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved method of drilling a well bore comprising the steps of:

(a) providing a drilling fluid which forms a filter cake on the walls of said well bore as said well bore is drilled comprised of a base fluid selected from the group consisting of water and oil, a viscosity increasing material and a hardenable furan sealant composition which becomes a part of said filter cake formed on the walls of said well bore and hardens therein whereby said filter cake is consolidated into a stable solid mass, said hardenable furan sealant composition comprising a furan liquid resin and a silane coupling agent; and (b) drilling said well bore using said drilling fluid.

2. The method of claim 1 wherein said furan liquid resin is selected from the group consisting of furfuryl alcohol resin, furfuraldehyde and a phenolic-furfuraldehyde mixture.

3. The method of claim 1 wherein said furan containing liquid is furfuryl alcohol resin.

4. The method of claim 1 wherein said furan containing liquid is present in said sealant composition in an amount in the range of from about 95% to about 99.9% by weight thereof.

5. The method of claim 1 wherein said silane coupling agent is selected from the group consisting of N-2-(aminoethyl)-3-aminopropyltrimethoxysilane, 3-glycidoxypropyl-trimethoxysilane and n-beta-(aminoethyl)-gamma-aminopropyltrimethoxysilane.

6. The method of claim 1 wherein said silane coupling agent is n-beta-(aminoethyl)-gamma-aminopropyltrimethoxysilane.

7. The method of claim 1 wherein said silane coupling agent is present in the sealant composition in an amount in the range of from about 0.1% to about 5% by weight thereof.

8. The method of claim 1 wherein said hardenable furan sealant composition is present in said drilling fluid in an amount in the range of from about 0.01% to about 40% by weight of said drilling fluid.

9. The method of claim 1 which further comprises the steps of:
   (c) running a pipe string in said well bore
   (d) placing a furan sealant composition comprised of a furan liquid resin and a silane coupling agent between said pipe and the walls of said well bore; and
   (e) allowing said furan sealant composition to harden therein.

10. The method of claim 9 wherein said furan liquid resin is selected from the group consisting of furfuryl alcohol resin, furfuraldehyde and a phenolic-furfuraldehyde mixture.

11. The method of claim 9 wherein said furan liquid resin is furfuryl alcohol resin.

12. The method of claim 9 wherein said furan liquid resin is present in said sealant composition in an amount in the range of from about 95% to about 99.9% by weight thereof.

13. The method of claim 9 wherein said silane coupling agent in said sealant composition is selected from the group consisting of N-2-(aminoethyl)-3-aminopropyltrimethoxysilane, 3-glycidoxypropyltrimethoxysilane and n-beta-(aminoethyl)-gamma-aminopropyltrimethoxysilane.

14. The method of claim 9 wherein said silane coupling agent is n-beta-(aminoethyl)-gamma-aminopropyltrimethoxysilane.

15. The method of claim 9 wherein said silane coupling agent is present in said sealant composition in an amount in the range of from about 0.1% to about 5% by weight thereof.

16. The method of claim 9 wherein said sealant composition further comprises a filler selected from the group consisting of crystalline silicas, amorphous silicas, clays, calcium carbonate, light weight polymer beads, ceramic microspheres and mixtures thereof.

17. An improved method of drilling a well bore comprising the steps of:
   (a) providing a drilling fluid which forms a filter cake on the walls of said well bore as said well bore is drilled comprised of a base fluid selected from the group consisting of water and oil, a viscosity increasing material and a hardenable furan sealant composition which becomes a part of said filter cake formed on the walls of said well bore and hardens therein whereby said filter cake is consolidated into a stable solid mass, said hardenable furan sealant composition comprising a furan liquid resin, a furfuryl alcohol, a hydrolyzable ester, a silane coupling agent and optionally, a solvent for said furan liquid resin; and
   (b) drilling said well bore using said drilling fluid.

18. The method of claim 17 wherein said furan liquid resin is selected from the group consisting of furfuryl alcohol resin, furfuraldehyde and a phenolic-furfuraldehyde mixture.

19. The method of claim 17 wherein said furan containing liquid is furfuryl alcohol resin.

20. The method of claim 17 wherein said furan liquid resin is present in said sealant composition in an amount in the range of from about 20% to about 80% by weight thereof.

21. The method of claim 17 wherein said furfuryl alcohol is present in said sealant composition in an amount in the range of from about 1% to about 50% by weight thereof.

22. The method of claim 17 wherein said hydrolyzable ester is selected from the group consisting of furfuryl acetate, butyl acetate, butyl lactate and methyl salicylate.

23. The method of claim 17 wherein said hydrolyzable ester is furfuryl acetate.

24. The method of claim 17 wherein said hydrolyzable ester is present in said sealant composition in an amount in the range of from about 0.1% to about 20% by weight thereof.

25. The method of claim 17 wherein said silane coupling agent in said sealant composition is selected from the group consisting of N-2-(aminoethyl)-3-aminopropyltrimethoxysilane, 3-glycidoxypropyltrimethoxysilane and n-beta-(aminoethyl)-gamma-aminopropyltrimethoxysilane.

26. The method of claim 17 wherein said silane coupling agent is n-beta-(aminoethyl)-gamma-aminopropyltrimethoxysilane.

27. The method of claim 17 wherein said silane coupling agent is present in said sealant composition in an amount in the range of from about 0.01% to about 5% by weight thereof.

28. The method of claim 17 wherein said hardenable furan sealant composition is present in said drilling fluid in an amount in the range of from about 0.1% to about 40% by weight of said drilling fluid.

29. The method of claim 17 which further comprises the steps of:
   (c) running a pipe string in said well bore
   (d) placing a furan sealant composition comprised of a furan liquid resin, furfuryl alcohol, a hydrolyzable ester and a silane coupling agent between said pipe and the walls of said well bore; and
   (e) allowing said furan sealant composition to harden therein.

30. The method of claim 29 wherein said furan liquid resin is selected from the group consisting of furfuryl alcohol resin, furfuraldehyde and a phenolic-furfuraldehyde mixture.

31. The method of claim 29 wherein said furan liquid resin is furfuryl alcohol resin.

32. The method of claim 29 wherein said furan liquid resin is present in said sealant composition in an amount in the range of from about 20% to about 80% by weight thereof.

33. The method of claim 29 wherein said furfuryl alcohol is present in said sealant composition in an amount in the range of from about 1% to about 50% by weight thereof.

34. The method of claim 29 wherein said hydrolyzable ester is selected from the group consisting of furfuryl acetate, butyl acetate, butyl lactate and methyl salicylate.

35. The method of claim 29 wherein said hydrolyzable ester is furfuryl acetate.

36. The method of claim 29 wherein said hydrolyzable ester is present in said sealant composition in an amount in the range of from about 0.1% to about 20% by weight thereof.

37. The method of claim 29 wherein said silane coupling agent in said sealant composition is selected from the group consisting of N-2-(aminoethyl)-3-aminopropyltrimethoxysilane, 3-glycidoxypropyltrimethoxysilane and n-beta-(aminoethyl)-gamma-aminopropyltrimethoxysilane.

38. The method of claim 29 wherein said silane coupling agent is n-beta-(aminoethyl)-gamma-aminopropyltrimethoxysilane.

39. The method of claim 29 wherein said silane coupling agent is present in said sealant composition in an amount in the range of from about 0.01% to about 5% by weight thereof.

40. The method of claim 29 wherein said sealant composition further comprises a filler selected from the group consisting of crystalline silicas, amorphous silicas, clays, calcium carbonate, light weight polymer beads, ceramic microspheres and mixtures thereof.

41. An improved drilling fluid for use in drilling a well bore which forms a filter cake on the walls of the well bore comprising:

a base fluid selected from the group consisting of water and oil;

a viscosity increasing material; and a hardenable furan sealant composition which becomes part of said filter cake formed on the walls of said well bore and hardens therein whereby said filter cake is consolidated into a stable solid mass, said sealant composition comprising a furan liquid resin and a silane coupling agent.

42. The drilling fluid of claim 41 wherein said furan liquid resin is selected from the group consisting of furfuryl alcohol resin, furfuraldehyde and a phenolic-furfuraldehyde mixture.

43. The drilling fluid of claim 41 wherein said furan liquid resin is furfuryl alcohol resin.

44. The drilling fluid of claim 41 wherein said furan liquid resin is present in said sealant composition in an amount in the range of from about 95% to about 99.9% by weight thereof.

45. The drilling fluid of claim 41 wherein said silane coupling agent in said sealant composition is selected from the group consisting of N-2-(aminoethyl)-3-aminopropyltrimethoxysilane, 3-glycidoxypropyltrimethoxysilane and n-beta-(aminoethyl)-gamma-aminopropyltrimethoxysilane.

46. The drilling fluid of claim 41 wherein said silane coupling agent is n-beta-(aminoethyl)-gamma-aminopropyltrimethoxysilane.

47. The drilling fluid of claim 41 wherein said silane coupling agent is present in said sealant composition in an amount in the range of from about 0.1% to about 5% by weight thereof.

48. The drilling fluid of claim 41 wherein said hardenable furan sealant composition is present in said drilling fluid in an amount in the range of from about 0.01% to about 40% by weight of said drilling fluid.

49. An improved drilling fluid for use in drilling a well bore which forms a filter cake on the walls of the well bore comprising:

a base fluid selected from the group consisting of water and oil;

a viscosity increasing material; and a hardenable furan sealant composition which becomes part of said filter cake formed on the walls of said well bore and hardens therein whereby said filter cake is consolidated into a stable solid mass, said sealant composition comprising a furan liquid resin, furfuryl alcohol, a hydrolyzable ester and a silane coupling agent.

50. The drilling fluid of claim 49 wherein said furan liquid resin is selected from the group consisting of furfuryl alcohol resin, furfuraldehyde and a phenolic-furfuraldehyde mixture.

51. The drilling fluid of claim 49 wherein said furan liquid resin is furfuryl alcohol resin.

52. The drilling fluid of claim 49 wherein said furan liquid resin is present in said sealant composition in an amount in the range of from about 20% to about 80% by weight thereof.

53. The drilling fluid of claim 49 wherein said furfuryl alcohol is present in said sealant composition in an amount in the range of from about 1% to about 50% by weight thereof.

54. The drilling fluid of claim 49 wherein said hydrolyzable ester is selected from the group consisting of furfuryl acetate, butyl acetate, butyl lactate and methyl salicylate.

55. The drilling fluid of claim 49 wherein said hydrolyzable ester is furfuryl acetate.

56. The drilling fluid of claim 49 wherein said hydrolyzable ester is present in said sealant composition in an amount in the range of from about 0.1% to about 20% by weight thereof.

57. The drilling fluid of claim 49 wherein said silane coupling agent in said sealant composition is selected from the group consisting of N-2-(aminoethyl)-3-aminopropyltrimethoxysilane, 3-glycidoxypropyltrimethoxysilane and n-beta-(aminoethyl)-gamma-aminopropyltrimethoxysilane.

58. The drilling fluid of claim 49 wherein said silane coupling agent is n-beta-(aminoethyl)-gamma-aminopropyltrimethoxysilane.

59. The drilling fluid of claim 49 wherein said silane coupling agent is present in said sealant composition in an amount in the range of from about 0.01% to about 5% by weight thereof.

60. The drilling fluid of claim 49 wherein said hardenable furan sealant composition is present in said drilling fluid in an amount in the range of from about 0.01% to about 40% by weight of said drilling fluid.

* * * * *